(12) United States Patent
Hart

(10) Patent No.: US 10,875,108 B2
(45) Date of Patent: Dec. 29, 2020

(54) TRIGGER LOCK FOR A MITER SAW

(71) Applicant: TTI (MACAO COMMERCIAL OFFSHORE) LIMITED, Macau (MO)

(72) Inventor: Michael Hart, Anderson, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 16/436,508

(22) Filed: Jun. 10, 2019

(65) Prior Publication Data

US 2019/0291192 A1    Sep. 26, 2019

Related U.S. Application Data

(63) Continuation of application No. 15/285,154, filed on Oct. 4, 2016, now abandoned.

(51) Int. Cl.
| | | |
|---|---|---|
| *B23D 45/04* | (2006.01) | |
| *B23Q 11/06* | (2006.01) | |
| *B23D 47/00* | (2006.01) | |
| *B25F 5/02* | (2006.01) | |
| *H01H 3/20* | (2006.01) | |
| *B23D 47/02* | (2006.01) | |
| *H01H 9/06* | (2006.01) | |

(52) U.S. Cl.
CPC .......... *B23D 45/042* (2013.01); *B23D 45/04* (2013.01); *B23D 47/00* (2013.01); *B23D 47/02* (2013.01); *B23D 47/025* (2013.01); *B23Q 11/06* (2013.01); *B25F 5/02* (2013.01); *H01H 3/20* (2013.01); *H01H 9/06* (2013.01)

(58) Field of Classification Search
CPC .... B23D 45/042; B23D 47/025; B23D 47/00; B23D 45/04; B23D 47/02; H01H 21/10; H01H 3/20; H01H 9/16; B23Q 11/06; B25F 5/02
USPC .............................. 83/471.3, 490, 473, 581; 200/43.01–43.22, 50.32–50.4, 318.1
See application file for complete search history.

(56) References Cited

U.S. PATENT DOCUMENTS

| | | |
|---|---|---|
| 4,879,438 A | 11/1989 | Winchester |
| 5,012,057 A | 4/1991 | Inuyama |
| 5,483,727 A | 1/1996 | Chang |
| 5,577,600 A | 11/1996 | Schoene et al. |
| 5,638,945 A | 6/1997 | Fukinuki et al. |
| 5,969,312 A | 10/1999 | Svetlik et al. |
| 6,057,518 A | 5/2000 | Bascom et al. |
| 6,340,802 B1 | 1/2002 | Bascom et al. |
| 6,355,892 B1 | 3/2002 | Marks |
| 6,538,218 B2 | 3/2003 | Bascom et al. |
| 6,610,946 B2 | 8/2003 | Covell et al. |
| 6,753,490 B2 | 6/2004 | Svetlik et al. |

(Continued)

*Primary Examiner* — Ghassem Alie
*Assistant Examiner* — Nhat Chieu Q Do
(74) *Attorney, Agent, or Firm* — Michael Best & Friedrich LLP

(57) ABSTRACT

A miter saw includes a base assembly and a saw unit pivotably coupled to the base assembly. The saw unit includes a motor for driving a saw blade about a rotational axis, a handle, a trigger coupled to the handle and moveable between a first position in which the motor is deactivated, and a second position in which the motor is activated to drive the saw blade, and a trigger lock pivotably coupled to the trigger for movement therewith to prevent movement of the trigger from the first position to the second position.

21 Claims, 6 Drawing Sheets

(56) References Cited

U.S. PATENT DOCUMENTS

| | | | |
|---|---|---|---|
| 6,805,208 B2 | 10/2004 | Kusmierski et al. | |
| 6,812,425 B1 | 11/2004 | Wong | |
| 6,861,598 B2 | 3/2005 | Bascom et al. | |
| 7,579,563 B2 | 8/2009 | Inagaki et al. | |
| 8,640,345 B2* | 2/2014 | Moreno | B27B 9/00 |
| | | | 30/371 |
| 8,716,908 B2 | 5/2014 | Takeda et al. | |
| 8,723,060 B2 | 5/2014 | Parrinello et al. | |
| 8,872,049 B2 | 10/2014 | Yuan | |
| 9,744,661 B2 | 8/2017 | Boeck et al. | |
| 9,978,541 B2* | 5/2018 | Mizutani | H02K 7/14 |
| 2008/0011592 A1 | 1/2008 | Liebert et al. | |
| 2010/0175972 A1 | 7/2010 | Kimata et al. | |
| 2011/0227429 A1* | 9/2011 | Takeda | B24B 55/052 |
| | | | 310/50 |
| 2014/0158391 A1 | 6/2014 | Xin et al. | |
| 2014/0349556 A1* | 11/2014 | Zhang | B25F 5/02 |
| | | | 451/359 |
| 2015/0113815 A1* | 4/2015 | McRoberts | B23D 51/01 |
| | | | 30/392 |
| 2015/0170848 A1 | 6/2015 | Kannan et al. | |
| 2017/0110266 A1* | 4/2017 | Chiang | B23D 59/001 |
| 2017/0125192 A1* | 5/2017 | Hanai | H01H 9/20 |

* cited by examiner

TRIGGER LOCK FOR A MITER SAW

CROSS REFERENCE TO RELATED APPLICATIONS

This application is a continuation of U.S. patent application Ser. No. 15/285,154 filed Oct. 4, 2016, the content of which is incorporated herein by reference.

FIELD OF THE INVENTION

The present invention relates to power tools, and more particularly to a trigger lock for miter saws.

BACKGROUND

Trigger locks are used in power tools to inhibit inadvertent activation of the power tool. In particular, a trigger lock prevents actuation of a trigger of the power tool until an operator of the power tool actuates the trigger lock. Thereafter, the operator can actuate the trigger, which activates the power tool.

SUMMARY OF THE INVENTION

The invention provides, in one aspect, a miter saw including a handle defining a gripping axis. The miter saw also includes a trigger having first and second sides. The first side defines a plane intersecting the gripping axis. The first and second sides are positioned opposite each other in a direction along the gripping axis of the handle. The trigger includes a top surface extending between the first and second sides, a bottom surface opposite the top surface, and a gripping surface also extending between the first and second sides. The trigger is coupled to the handle and slidable along an actuation axis between a first position in which the miter saw is deactivated, and a second position in which the miter saw is activated. The miter saw includes a trigger lock pivotably coupled to the trigger about a pivot axis for movement with the trigger along the actuation axis. The trigger lock prevents movement of the trigger from the first position to the second position. The trigger lock is configured to pivot from a locked position to an unlocked position in response to a finger of an operator sliding along the gripping surface of the trigger in a lateral direction from the first side to the second side of the trigger. The first side of the trigger includes an opening in which a portion of the trigger lock extends to engage a wall of the handle to prevent movement of the trigger from the first position to the second position.

The invention provides, in another aspect, a miter saw including a handle defining a gripping axis. The miter saw also includes a trigger having first and second sides positioned opposite each other in a direction along the gripping axis of the handle. The first side defines a plane intersecting the gripping axis. The first side has a slide coupled to the handle to enable slidable movement of the trigger along an actuation axis between a first position and a second position. The trigger also includes a top surface extending between the first and second sides, a bottom surface opposite the top surface, and a gripping surface also extending between the first and second sides. The miter saw includes a switch coupled to the handle. The switch is biased into a first state in which the miter saw is deactivated when the trigger is in the first position. The switch is movable from the first state to a second state to activate the miter saw in response to the slide actuating the switch when the trigger is in the second position. The miter saw includes a trigger lock pivotably coupled to the trigger by a pin for movement with the trigger along the actuation axis. The trigger lock prevents movement of the trigger from the first position to the second position when the trigger lock is in a locked position. The trigger lock is pivotable from the locked position to an unlocked position in response to a finger of an operator sliding along the gripping surface of the trigger in a lateral direction from the first side to the second side of the trigger. The first side of the trigger includes an opening in which a portion of the trigger lock extends to engage a wall of the handle to prevent movement of the trigger from the first position to the second position when the trigger lock is in the locked position. A portion of the gripping surface of the trigger defines a trigger plane substantially parallel to the gripping axis of the handle. The pin is positioned on one side of the trigger plane in a direction transverse to the trigger plane and the switch is positioned on the other side of the trigger plane in a direction transverse to the trigger plane.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
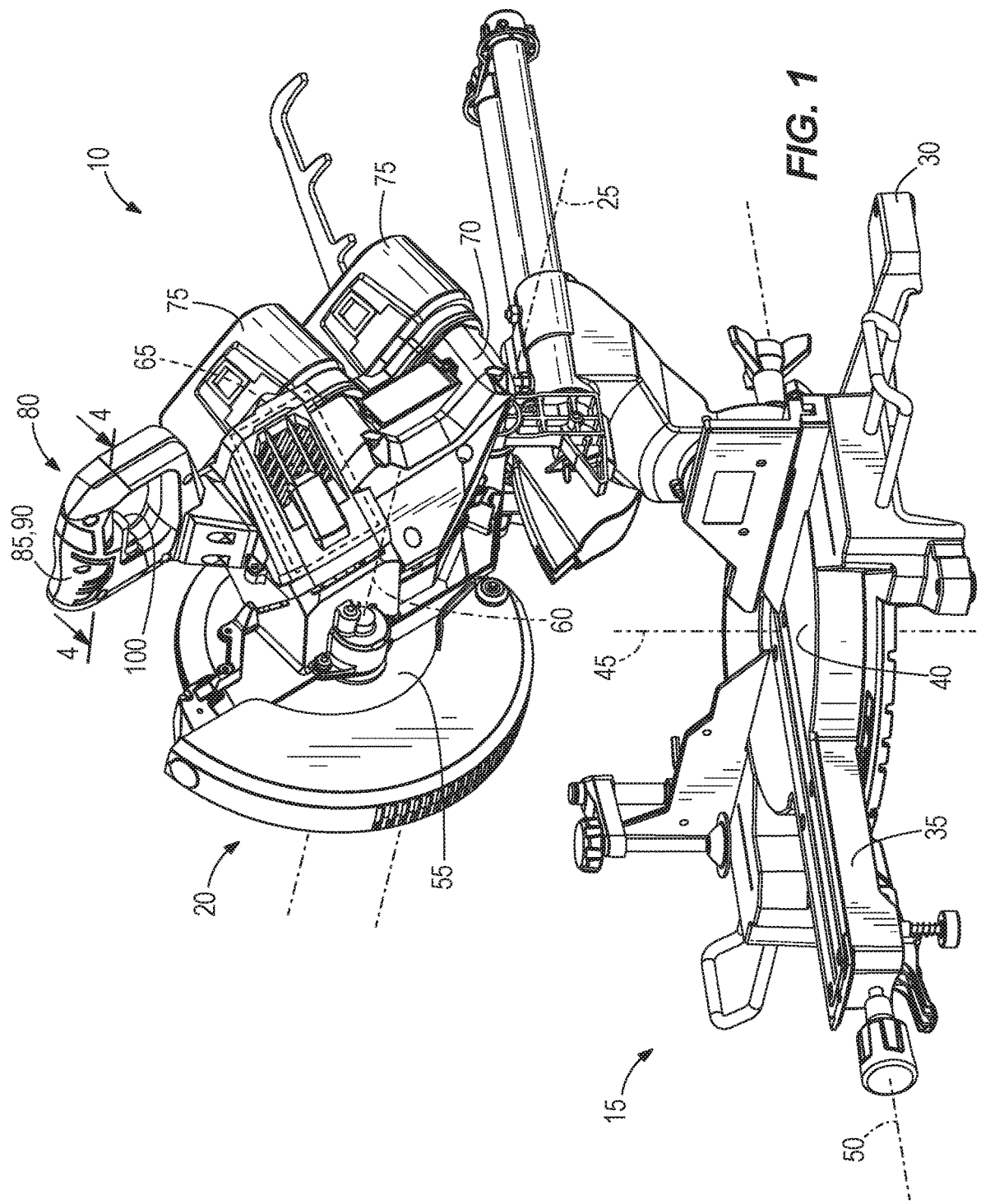
FIG. 1 is a perspective view of a miter saw in accordance with an embodiment of the invention including a base assembly and a saw unit.

With reference to FIG. 1, a power tool (i.e., a miter saw 10) includes a base assembly 15 and a saw unit 20 pivotably coupled to the base assembly 15 about a horizontal chop axis 25. The base assembly 15 includes a base 30 and a turntable 35 that collectively define a work piece support surface 40. The turntable 35 is pivotably coupled to the base 30 about a vertical miter axis 45 for the saw unit 20 to perform a first angled cut (e.g., a miter cut) on a work piece supported on the work piece support surface 40. In addition, the saw unit 20 is pivotably coupled to the turntable 35 about a horizontal bevel axis 50 for the saw unit 20 to perform a second angled cut (e.g., a bevel cut) on the work piece supported on the work piece support surface 40.

With continued reference to FIG. 1, the saw unit 20 includes a saw blade 55 rotatable about a rotational axis 60 parallel with the chop axis 25 and an electric motor 65 supported within a motor housing 70. In the illustrated embodiment of the miter saw 10, the motor 65 is a brushless direct current (i.e., DC) electric motor. However, in other embodiments of the miter saw 10, the motor 65 may be a brushed DC motor. The saw unit 20 is powered by multiple battery packs 75 supported atop the motor housing 70. In the illustrated embodiment of the miter saw 10, the battery packs 75 are 18 volt lithium-ion power tool battery packs that are also usable with other power tools (e.g., drills, circular saws, and the like). The battery packs 75 are wired in series to provide the combined voltage of the batteries, 32 volts, to the motor 65 when activated. In other embodiments of the miter saw 10, battery packs 75 having different nominal voltages (e.g., 12 volts, 18 volts, 28 volts, etc.) may be used, and/or the miter saw 10 may only include one battery pack 75. In further embodiments of the miter saw 10, the motor 65 may be coupled to an alternating current (i.e., AC) power source.

Figure 2:
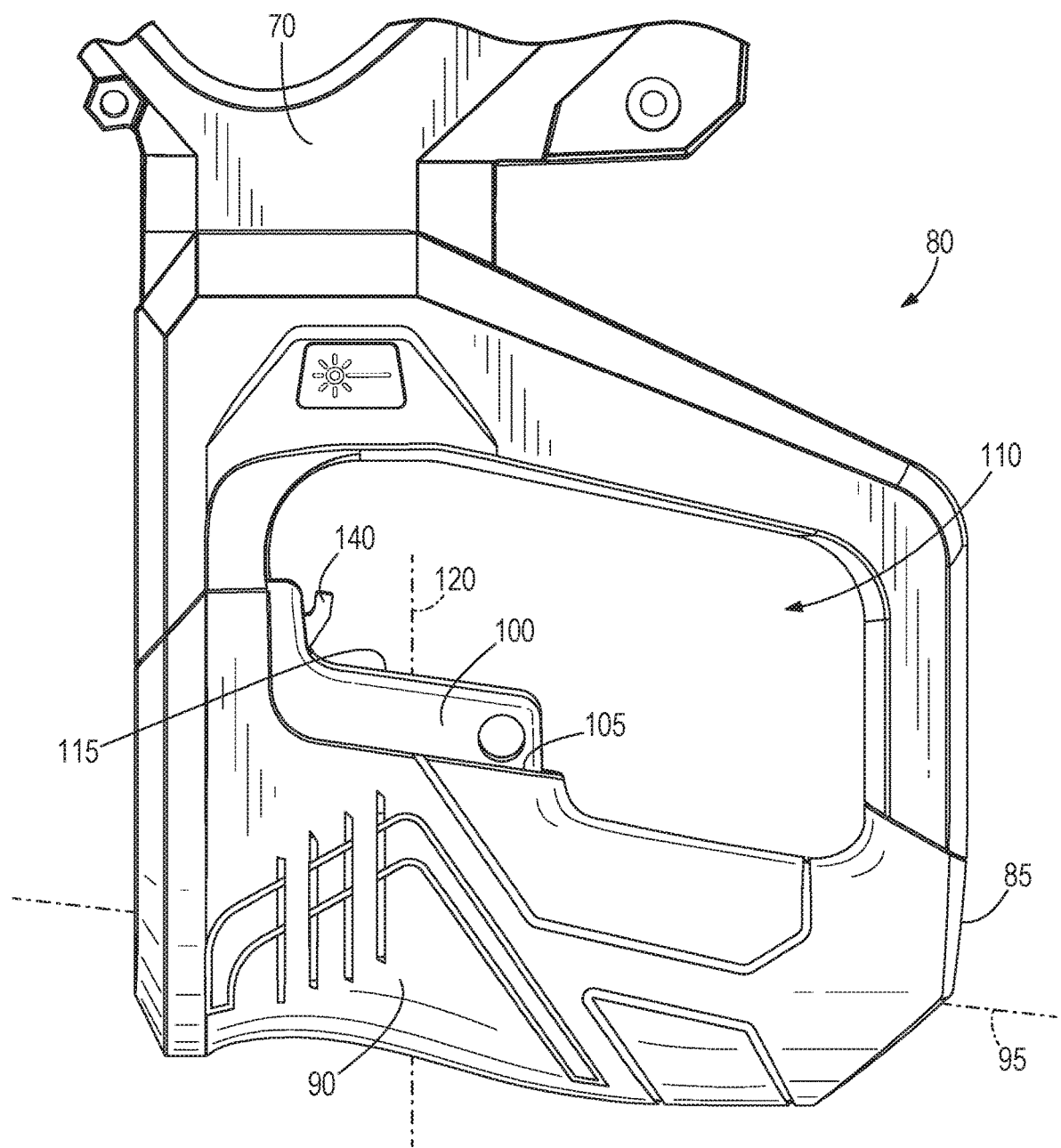
FIG. 2 is a top view of a trigger assembly of the saw unit of FIG. 1 including a handle, a trigger, and a trigger lock.
Figure 3:
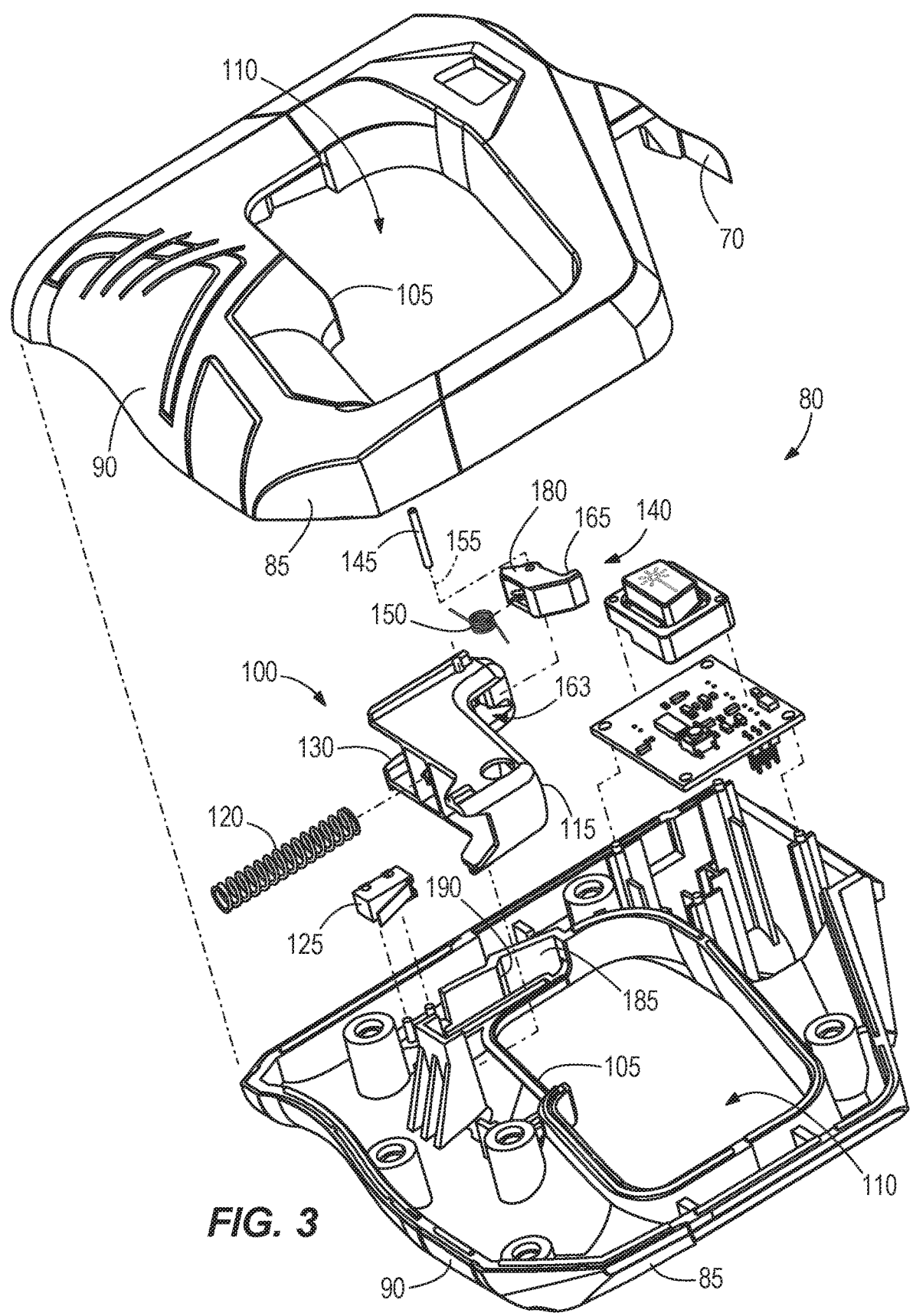
FIG. 3 is an exploded view of the trigger assembly of FIG. 2.
Figure 4:
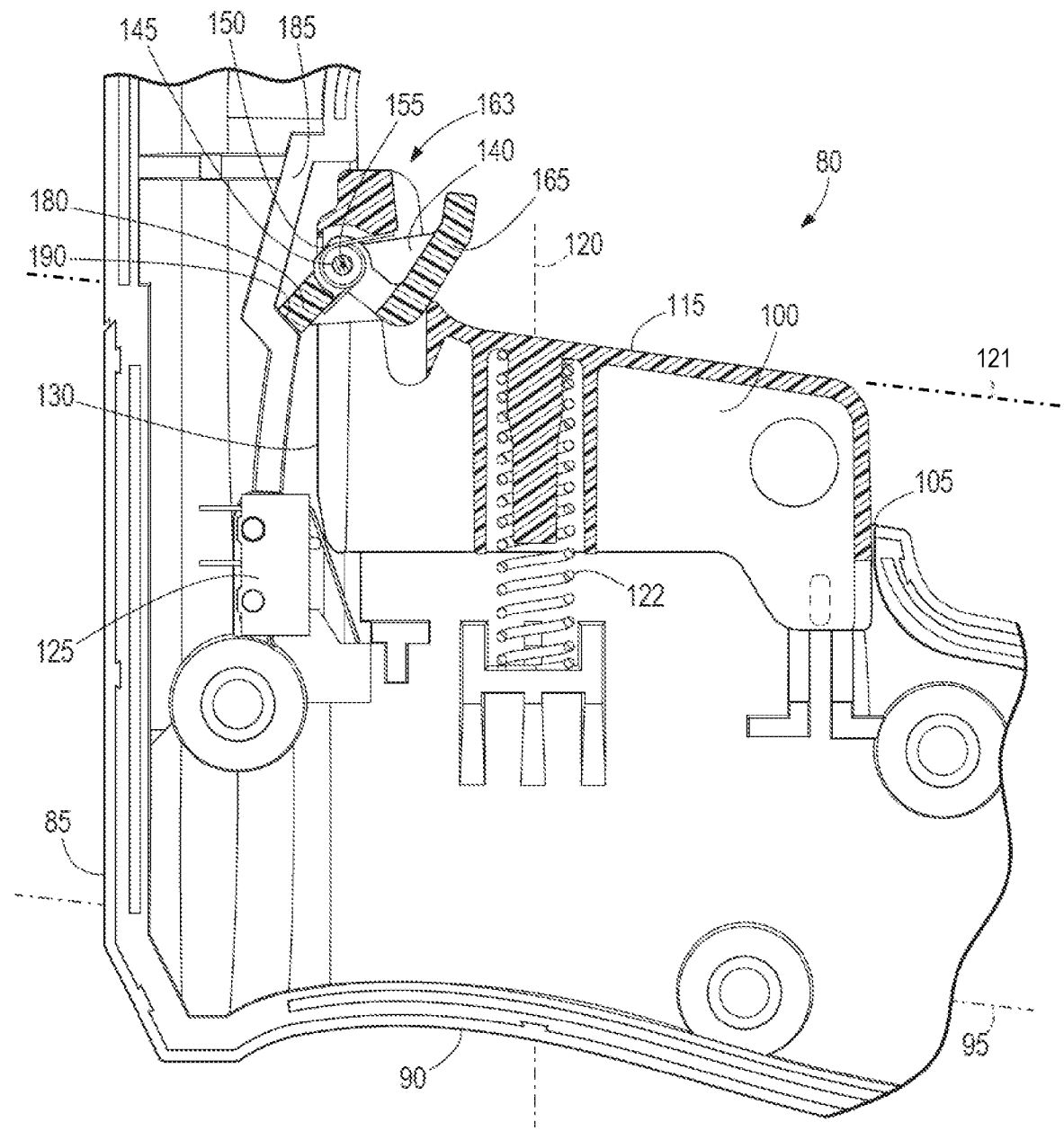
FIG. 4 is a partial cutaway view of the trigger assembly of FIG. 2, illustrating the trigger in a deactivated position and the trigger lock in a locked position.

As shown in FIG. 1, the saw unit 20 also includes a trigger assembly 80 extending from the motor housing 70 in a forward direction of the miter saw 10. With reference to FIG. 2, the trigger assembly 80 includes a handle 85 having a gripping portion 90 defining a gripping axis 95 which, in the illustrated embodiment of the miter saw 10, is obliquely oriented relative to the chop axis 25. The trigger assembly 80 also includes a trigger 100 coupled to the handle 85 adjacent the gripping portion 90. The gripping portion 90 of the handle 85 includes an aperture 105 from which the trigger 100 protrudes, with the shrouded portion of the trigger 100 being received within the interior of the handle 85 and the exposed portion of the trigger 100 being situated in an opening 110 defined by the handle 85. The trigger 100 includes a gripping surface 115 against which an operator of the miter saw 10 presses, with one or more fingers, for moving (i.e., sliding) the trigger 100 from a first or deactivated position (FIGS. 2, 4, and 5) to a second or activated position (FIG. 6) along an actuation axis 120. With reference to FIG. 4, a portion of the gripping surface 115 of the trigger 100 defines a trigger plane 121 substantially parallel to the gripping axis 95 of the handle 85. In the illustrated embodiment of the miter saw 10, the actuation axis 120 is obliquely oriented relative to the gripping axis 95. Alternatively, the actuation axis 120 may be substantially perpendicular to the gripping axis 95. With reference to FIG. 3, the trigger 100 is biased toward the deactivated position shown in FIGS. 2, 4, and 5 by a compression spring 122. In other embodiments of the miter saw 10, the trigger 100 may be pivotably coupled to the handle 85.

With reference to FIG. 3, the trigger assembly 80 further includes a switch 125 within the handle 85 adjacent a slide 130 on the trigger 100. The switch 125 is in electrical communication with the motor 65 via a motor controller (not shown), and is biased into a first (e.g., open) state (shown in FIGS. 4 and 5) in which the motor 65 is deactivated. Likewise, the switch 125 activates the motor 65 when the switch 125 is actuated into a second (e.g., closed) state (shown in FIG. 6). Moreover, the switch 125 is biased into the first state when the trigger 100 is in the deactivated position, and the slide 130 on the trigger 100 directly engages the switch 125 to toggle the switch 125 into the second state in response to the trigger 100 being moved into the activated position.

Figure 5:
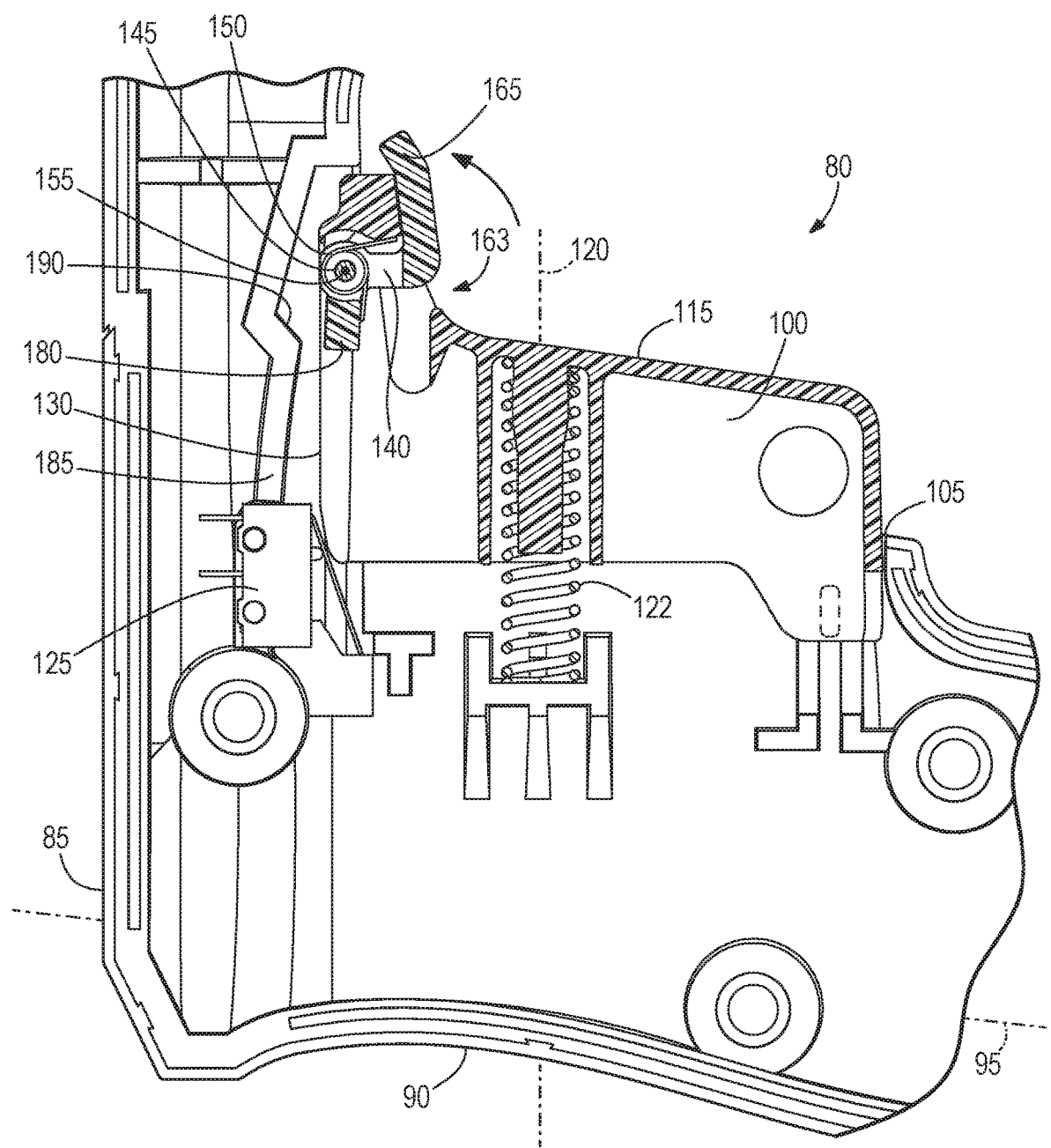
FIG. 5 is a partial cutaway view of the trigger assembly of FIG. 2, illustrating the trigger in the deactivated position and the trigger lock in an unlocked position.
Figure 6:
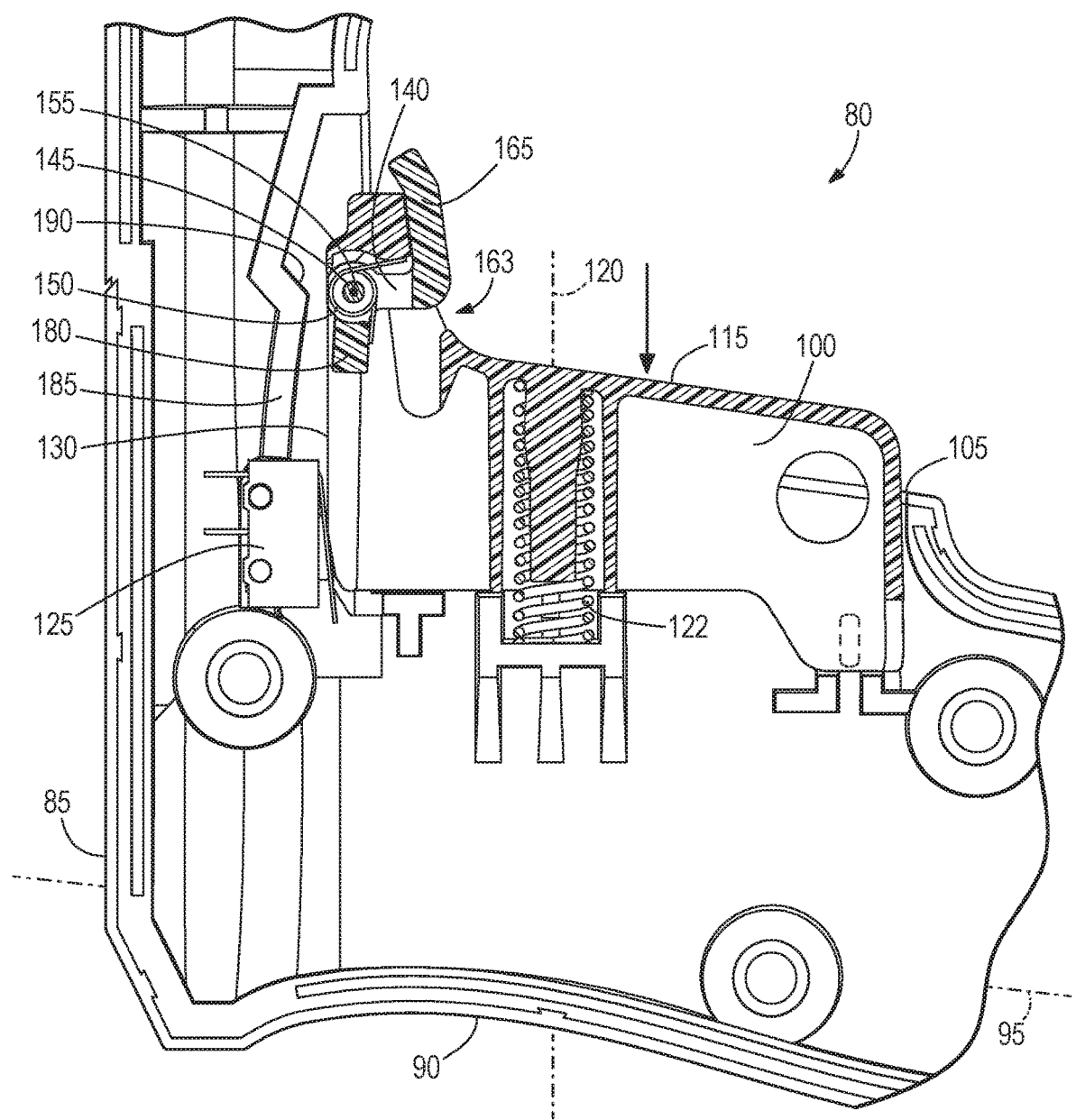
FIG. 6 is a partial cutaway view of the trigger assembly of FIG. 2, illustrating the trigger in an activated position and the trigger lock in the unlocked position.

The trigger assembly 80 also includes a trigger lock 140 pivotably coupled to the trigger 100 for movement therewith about a pin 145 between a first or locked position (FIGS. 2 and 4) and a second or unlocked position (FIGS. 5 and 6). A torsion spring 150 is positioned between the trigger 100 and the trigger lock 140 to bias the trigger lock 140 toward the locked position which, from the frame of reference of FIG. 4, is in a clockwise direction. The pin 145 defines a pivot axis 155 (FIG. 3) located within a periphery of the trigger 100 that is substantially perpendicular to the actuation axis 120. With reference to FIGS. 3-6, the trigger 100 includes an aperture 163 through which an actuation arm 165 of the trigger lock 140 protrudes when the trigger lock 140 is in the locked position and the unlocked position. In other embodiments of the miter saw 10, the actuation arm 165 of the trigger lock 140 may protrude from the aperture 163 at least when the trigger lock 140 is in the locked position. As discussed in more detail below, the actuation arm 165 is engageable by the operator of the miter saw 10 with the same finger (e.g., the operator's index finger) used for depressing the trigger 100. The trigger lock 140 also includes an end 180 located opposite the actuation arm 165, with the pivot axis 155 positioned between the end 180 and the actuation arm 165. The end 180 of the trigger lock 140 is extendable beyond the outer periphery of the trigger 100 to interface with a wall 185 formed on the handle 85, which defines a blocking surface 190 against which the end 180 is abutted when the trigger lock 140 is in the locked position and the trigger 100 is in the deactivated position. In the illustrated embodiment of the miter saw 10, the blocking surface 190 is obliquely oriented relative to the actuation axis 120.

With reference to FIG. 4, the trigger lock 140 and the trigger 100 are in the locked and deactivated positions, respectively. In the deactivated position of the trigger 100, the slide 130 is spaced from the switch 125, which is biased into the first state to deactivate the motor 65 and inhibit rotation of the saw blade 55. The end 180 of the trigger lock 140 is also biased into engagement with the blocking surface 190 by the spring 150, preventing sliding movement of the trigger 100 along the actuation axis 120 from the deactivated position to the activated position. In other words, the trigger lock 140 locks the trigger 100 in the deactivated position when the end 180 engages the blocking surface 190 so that the trigger 100 is inhibited from actuating the switch 125 into the second state. Accordingly, the trigger lock 140 prevents the operator of the miter saw 10 from inadvertently depressing the trigger 100 and activating the motor 65 to drive the saw blade 55.

To move the trigger lock 140 from the locked position to the unlocked position, the operator of the miter saw 10 inserts their fingers through the opening 110 in the handle 85 such that at least one finger (e.g., the index finger) of the operator engages the gripping surface 115 of the trigger 100 and the actuation arm 165. With reference to FIG. 5, the operator of the miter saw 10 then moves their index finger laterally (i.e., generally parallel with the gripping axis 95) toward the wall 185, depressing the actuation arm 165 of the trigger lock 140, causing it to pivot about the pivot axis 155 against the bias of the spring 150 in the counterclockwise direction from the frame of reference of FIG. 5 into the unlocked position. In the unlocked position, the end 180 is disengaged from the blocking surface 190 of the wall 185, no longer preventing rearward sliding movement of the trigger 100.

With reference to FIG. 6, the operator of the miter saw 10 maintains the trigger lock 140 in the unlocked position and slides the trigger 100 toward the activated position, where the motor 65 is activated to drive the saw blade 55. Once the end 180 of the trigger lock 140 moves past the blocking surface 190, the operator may optionally release the trigger lock 140, allowing the torsion spring 150 to pivot the trigger lock 140 about the pivot axis 155 in a clockwise direction from the frame of reference of FIG. 6.

To stop the rotational movement of the saw blade 55, the operator of the miter saw 10 releases the trigger 100, prompting the compression spring 122 to return the trigger 100 to the deactivated position shown in FIG. 4. Accordingly, the slide 130 on the trigger 130 disengages the switch 125, returning it to the first state to deactivate the motor 65. In addition, if not previously released, the trigger lock 140 is released simultaneously with the trigger 100, causing the torsion spring 150 to return the trigger lock 140 to the locked position (with the end 180 abutting the blocking surface 190) shortly after the trigger 100 reaches the deactivated position.

Various features of the invention are set forth in the following claims.

What is claimed is:

1. A miter saw comprising:
   a handle defining a gripping axis;
   a trigger including first and second end surfaces, the first end surface defining a plane intersecting the gripping axis, the first and second end surfaces positioned opposite each other in a direction along the gripping axis of the handle, a top surface extending between the first and second end surfaces, a bottom surface opposite the top surface, and a gripping surface also extending between the first and second end surfaces, the trigger coupled to the handle and slidable along an actuation axis between a first position in which the miter saw is deactivated, and a second position in which the miter saw is activated; and
   a trigger lock positioned adjacent the first end surface, the trigger lock pivotably coupled to the trigger about a pivot axis for movement with the trigger along the actuation axis, the trigger lock preventing movement of the trigger from the first position to the second position;
   wherein the trigger lock is configured to pivot from a locked position to an unlocked position in response to a finger of an operator sliding along the gripping surface of the trigger in a lateral direction from the first end surface to the second end surface of the trigger; and
   wherein the first end surface of the trigger includes an opening in which a portion of the trigger lock extends beyond the first end surface to engage a wall of the handle to prevent movement of the trigger from the first position to the second position.

2. The miter saw of claim 1, further comprising a switch coupled to the handle and engageable with the trigger, wherein a portion of the gripping surface defines a trigger plane substantially parallel to the gripping axis of the handle, and wherein the pivot axis is positioned on one side of the trigger plane in a direction transverse to the trigger plane and the switch is positioned on the other side of the trigger plane in a direction transverse to the trigger plane.

3. The miter saw of claim 2, wherein the trigger includes a slide having the first end surface, wherein the slide is coupled to the handle to enable slidable movement of the trigger along the actuation axis, and wherein the slide is engageable with the switch when the trigger is in the second position.

4. The miter saw of claim 1, wherein the trigger includes a slide having the first end surface, wherein the slide is coupled to the handle to enable slidable movement of the trigger along the actuation axis, and wherein the slide is engageable with a switch when the trigger is in the second position.

5. The miter saw of claim 1, further comprising a switch biased into a first state in which the miter saw is deactivated when the trigger is in the first position, and wherein the switch is actuated from the first state to a second state to activate the miter saw in response to the trigger being moved from the first position to the second position.

6. The miter saw of claim 5, wherein the trigger is directly engageable with the switch to actuate the switch from the first state to the second state.

7. The miter saw of claim 1, wherein the pivot axis is disposed within a periphery of the trigger.

8. The miter saw of claim 1, wherein the pivot axis of the trigger lock is substantially perpendicular to the actuation axis of the trigger.

9. The miter saw of claim 1, wherein the trigger includes an aperture through which an actuation arm of the trigger lock protrudes at least when the trigger lock is in the locked position.

10. The miter saw of claim 9, wherein the aperture is adjacent the gripping surface, and wherein the actuation arm of the trigger lock is engageable by the operator of the miter saw with the same finger used for engaging the gripping surface and depressing the trigger from the first position to the second position.

11. The miter saw of claim 10, further comprising a spring biasing the trigger lock toward the locked position, wherein the spring biases the portion of the trigger lock into alignment with a blocking surface of the wall when the trigger lock is in the locked position to lock the trigger in the first position.

12. The miter saw of claim 11, wherein the actuation axis is substantially perpendicular to the pivot axis of the trigger lock, and wherein the blocking surface is obliquely oriented relative to the actuation axis.

13. The miter saw of claim 11, wherein an end of the trigger lock is movable past the blocking surface in response to the trigger lock being pivoted to the second position and the trigger being moved from the first position to the second position.

14. The miter saw of claim 1, wherein the wall of the handle is a recessed wall within the handle so that the portion of the trigger lock is located within the handle to prevent movement of the trigger from the first position to the second position.

15. A miter saw comprising:
   a handle defining a gripping axis;
   a trigger including first and second sides positioned opposite each other in a direction along the gripping axis of the handle, the first side defining a plane intersecting the gripping axis, the first side having a slide coupled to the handle to enable slidable movement of the trigger along an actuation axis between a first position and a second position, the trigger also including a top surface extending between the first and second sides, a bottom surface opposite the top surface, and a gripping surface also extending between the first and second sides;
   a switch coupled to the handle, the switch biased into a first state in which the miter saw is deactivated when the trigger is in the first position, the switch movable from the first state to a second state to activate the miter saw in response to the slide engaging and actuating the switch when the trigger is in the second position; and a trigger lock pivotably coupled to the trigger by a pin for movement with the trigger along the actuation axis, the trigger lock preventing movement of the trigger from the first position to the second position when the trigger lock is in a locked position, the trigger lock pivotable from the locked position to an unlocked position in response to a finger of an operator sliding along the gripping surface of the trigger in a lateral direction from the first side to the second side of the trigger;

wherein the first side of the trigger includes an opening in which a portion of the trigger lock extends to engage a wall of the handle to prevent movement of the trigger from the first position to the second position when the trigger lock is in the locked position; and wherein a portion of the gripping surface of the trigger defines a trigger plane substantially parallel to the gripping axis of the handle, and wherein the pin is positioned on one side of the trigger plane in a direction transverse to the trigger plane and the switch is positioned on the other side of the trigger plane in a direction transverse to the trigger plane.

16. The miter saw of claim 15, further comprising a spring biasing the trigger lock toward the locked position, wherein the spring biases the portion of the trigger lock into alignment with a blocking surface of the wall when the trigger lock is in the locked position to lock the trigger in the first position.

17. The miter saw of claim 16, wherein the actuation axis is substantially perpendicular to a pivot axis of the trigger lock, and wherein the blocking surface is obliquely oriented relative to the actuation axis.

18. The miter saw of claim 15, wherein the wall of the handle is a recessed wall within the handle so that the portion of the trigger lock is located within the handle to prevent movement of the trigger from the first position to the second position.

19. The miter saw of claim 15, wherein the slide of the trigger is directly engageable with the switch to actuate the switch from the first state to the second state.

20. The miter saw of claim 15, wherein the first side of the trigger is a first end surface, and wherein the first end surface includes the slide.

21. The miter saw of claim 15, wherein a first portion of the slide extends beyond the top surface and a second portion of the slide extends beyond the bottom surface.

* * * * *